(12) United States Patent
Xie et al.

(10) Patent No.: US 12,498,150 B2
(45) Date of Patent: Dec. 16, 2025

(54) COMBINED HEAT EXCHANGER, HEAT EXCHANGING SYSTEM AND THE OPTIMIZATION METHOD THEREOF

(71) Applicant: Carrier Corporation, Palm Beach Gardens, FL (US)

(72) Inventors: KangShan Xie, Shanghai (CN); Linhui Chen, Shanghai (CN); Fei Xie, Shanghai (CN)

(73) Assignee: CARRIER CORPORATION, Palm Beach Gardens, FL (US)

( * ) Notice: Subject to any disclaimer, the term of this patent is extended or adjusted under 35 U.S.C. 154(b) by 142 days.

(21) Appl. No.: 18/298,586

(22) Filed: Apr. 11, 2023

(65) Prior Publication Data
US 2023/0243558 A1    Aug. 3, 2023

Related U.S. Application Data

(62) Division of application No. 17/252,566, filed as application No. PCT/US2020/031624 on May 6, 2020, now Pat. No. 11,662,125.

(30) Foreign Application Priority Data

May 7, 2019    (CN) .......................... 201910375088.8

(51) Int. Cl.
*F25B 40/00* (2006.01)
*B60H 1/32* (2006.01)
(Continued)

(52) U.S. Cl.
CPC .......... *F25B 40/00* (2013.01); *B60H 1/3227* (2013.01); *F25B 40/06* (2013.01); *F25B 41/34* (2021.01);
(Continued)

(58) Field of Classification Search
CPC .......... F25B 40/06; F25B 41/34; F25B 41/48; F25B 2500/08; F25B 2500/18; F25B 2700/21152; B60H 1/3227
See application file for complete search history.

(56) References Cited

U.S. PATENT DOCUMENTS

| | | | |
|---|---|---|---|
| 4,006,776 A * | 2/1977 | Pfouts | F28D 9/0075 165/166 |
| 5,095,712 A | 3/1992 | Narreau | |

(Continued)

FOREIGN PATENT DOCUMENTS

| | | |
|---|---|---|
| EP | 0924478 A2 | 6/1999 |
| EP | 2706312 A1 | 3/2014 |

(Continued)

OTHER PUBLICATIONS

KR-20140008677-A Translation.*

(Continued)

*Primary Examiner* — David J Teitelbaum
(74) *Attorney, Agent, or Firm* — CANTOR COLBURN LLP

(57) ABSTRACT

A combined heat exchanger, a heat exchange system, and an optimization method thereof are provided. The heat exchange system includes: an enhanced vapor injection compressor, a condenser, an expansion valve and an evaporator, which are located in a main circuit; wherein the heat exchange system further includes a first branch branched from the main circuit to an vapor injection port of the compressor at a branch point P downstream of the condenser, and a first heat exchange unit and a second heat exchange unit are further provided in the main circuit between the branch point P and the expansion valve; and wherein a refrigerant leaving the condenser is divided at the branch point P into a first portion passing through the first heat exchange unit and the second heat exchange unit from (Continued)

the main circuit, and a second portion passing through the first branch to the vapor injection port.

2 Claims, 2 Drawing Sheets

(51) Int. Cl.
  *F25B 40/06* (2006.01)
  *F25B 41/34* (2021.01)
  *F25B 41/48* (2021.01)
(52) U.S. Cl.
  CPC .......... *F25B 41/48* (2021.01); *F25B 2500/08* (2013.01); *F25B 2500/18* (2013.01); *F25B 2700/21152* (2013.01)

(56) References Cited

U.S. PATENT DOCUMENTS

| | | | |
|---|---|---|---|
| 5,400,609 A | 3/1995 | Sjoholm et al. |
| 5,598,718 A | 2/1997 | Freund et al. |
| 5,669,234 A | 9/1997 | Houser et al. |
| 5,899,091 A | 5/1999 | Fraser, Jr. et al. |
| 6,032,472 A | 3/2000 | Heinrichs et al. |
| 6,718,781 B2 | 4/2004 | Freund et al. |
| 6,860,114 B2 | 3/2005 | Jacobsen |
| 7,131,291 B2 | 11/2006 | Aflekt et al. |
| 7,523,623 B2 | 4/2009 | Taras et al. |
| 7,654,109 B2 | 2/2010 | Vaisman et al. |
| 7,810,353 B2 | 10/2010 | Groll et al. |
| 8,322,150 B2 | 12/2012 | Mitra et al. |
| 8,671,703 B2 | 3/2014 | Mitra et al. |
| 8,789,381 B2 | 7/2014 | Awwad et al. |
| 9,134,058 B2 | 9/2015 | Ikemiya et al. |
| 9,612,042 B2 | 4/2017 | Sjoholm et al. |
| 9,971,366 B2 | 5/2018 | Thøgersen et al. |
| 10,047,989 B2 | 8/2018 | Huff et al. |
| 10,088,202 B2 | 10/2018 | Huff et al. |
| 10,107,536 B2 | 10/2018 | Senf, Jr. et al. |
| 2003/0010046 A1* | 1/2003 | Freund .................... F25B 49/02 62/513 |
| 2005/0109485 A1* | 5/2005 | Kolb .................. B60H 1/00328 165/42 |
| 2006/0080989 A1* | 4/2006 | Aoki ....................... F25B 40/00 62/324.4 |
| 2006/0123840 A1* | 6/2006 | Lifson .................... F25B 41/22 62/513 |
| 2012/0103005 A1 | 5/2012 | Kopko et al. |
| 2015/0121930 A1 | 5/2015 | Kasuya |
| 2015/0253040 A1 | 9/2015 | Aschan et al. |
| 2016/0138836 A1 | 5/2016 | Senf, Jr. et al. |
| 2016/0236538 A1 | 8/2016 | Suzuki et al. |
| 2017/0182869 A1 | 6/2017 | Kujak et al. |
| 2018/0195773 A1 | 7/2018 | Saunders et al. |
| 2022/0048366 A1 | 2/2022 | Xie et al. |

FOREIGN PATENT DOCUMENTS

| | | | | |
|---|---|---|---|---|
| KR | 20130027289 A | | 3/2013 | |
| KR | 20140008677 A | * | 1/2014 | .............. F25B 41/40 |
| WO | 2018226986 A1 | | 12/2018 | |

OTHER PUBLICATIONS

International Search Report issued in Application No. PCT/US2020/031624 on Nov. 3, 2020, 8 pages.
Written Opinion issued in Application No. PCT/US2020/031624 on Nov. 3, 2020, 8 pages.
European Search Report for Application No. 20728326.8, Issued Jan. 30, 2025, 13 Pages.

* cited by examiner

| Condition<br>System | 30/0C | | | 30/-20C | | | 30/30C | | |
|---|---|---|---|---|---|---|---|---|---|
| | Capacity<br>W | Efficiency<br>/ | compressor exhaust temperature<br>C | Capacity<br>W | Efficiency<br>/ | compressor exhaust temperature<br>C | Capacity<br>W | Efficiency<br>/ | compressor exhaust temperature<br>C |
| System 1 | 5308 | 1.29 | 88.2 | 2941 | 0.97 | 93.6 | 9484 | 1.59 | 92.9 |
| System 2 | 5691 | 1.24 | 85.3 | 3447 | 0.98 | 89.5 | 9542 | 1.51 | 89.4 |
| New System | 5847 | 1.38 | 92.5 | 3544 | 1.07 | 96.9 | 9750 | 1.68 | 95.4 |

COMBINED HEAT EXCHANGER, HEAT EXCHANGING SYSTEM AND THE OPTIMIZATION METHOD THEREOF

CROSS-REFERENCE TO RELATED APPLICATIONS

This application is a division of U.S. application Ser. No. 17/252,566 filed Dec. 15, 2020, which is a National Stage Application of PCT/US2020/031624 filed May 6, 2020, which claims the benefit of CN Application No. 201910375088.8, filed on May 7, 2019, the contents of each application is incorporated herein by reference in its entirety.

FIELD OF THE INVENTION

The present disclosure relates to the field of heat exchange systems, and more particularly, the present disclosure relates to a combined heat exchanger, a heat exchange system, and an optimization method thereof that are particularly suitable for a refrigeration system for an electric transport vehicle.

BACKGROUND OF THE INVENTION

A refrigeration system on a transport vehicle may be equipped with an enhanced vapor injection (EVI) compressor. In this type of refrigeration system, a portion of refrigerant leaving a condenser may be introduced into an enhanced vapor injection inlet of the compressor after throttling, thereby controlling exhaust temperature of the compressor without sacrificing system capacity.

SUMMARY OF THE INVENTION

An object of the present disclosure is to solve or at least alleviate the problems existing in the related art.

In one aspect, a heat exchange system, particularly a refrigeration system for an electric transport vehicle, is provided, which includes: an enhanced vapor injection compressor, a condenser, an expansion valve and an evaporator, which are located in a main circuit; wherein the heat exchange system further includes a first branch branched from the main circuit to an vapor injection port of the compressor at a branch point P downstream of the condenser, and a first heat exchange unit and a second heat exchange unit are further provided in the main circuit between the branch point P and the expansion valve; and wherein a refrigerant leaving the condenser is divided at the branch point P into a first portion passing through the first heat exchange unit and the second heat exchange unit from the main circuit, and a second portion passing through the first branch to the vapor injection port, and wherein the second portion of the refrigerant passes through a branch expansion valve and exchanges heat in the first heat exchange unit with the first portion of the refrigerant in the main circuit, and the first portion of the refrigerant exchanges heat in the second heat exchange unit with a refrigerant flowing from the evaporator to an inlet of the compressor.

Optionally, according to some embodiments of the heat exchange system, the first heat exchange unit and the second heat exchange unit are independent heat exchangers.

Optionally, according to some embodiments of the heat exchange system, the first heat exchange unit and the second heat exchange unit are included in an integrated combined heat exchanger.

Optionally, according to some embodiments of the heat exchange system, the combined heat exchanger includes: a main flow path, which extends between an inlet of the main flow path and an outlet of the main flow path, and which includes a first portion located in the first heat exchange unit and a second portion located in the second heat exchange unit; a first heat-exchange flow path, which extends between an inlet of the first heat-exchange flow path and an outlet of the first heat-exchange flow path, and which exchanges heat in the first heat exchange unit with the first portion of the main flow path; and a second heat-exchange flow path, which extends between an inlet of the second heat-exchange flow path and an outlet of the second heat-exchange flow path, and which exchanges heat in the second heat exchange unit with the second portion of the main flow path.

Optionally, according to some embodiments of the heat exchange system, the combined heat exchanger is a plate heat exchanger.

Optionally, according to some embodiments of the heat exchange system, the first branch further includes a check valve disposed between the first heat exchange unit and the vapor injection port of the compressor, and a first pressure sensor and a first temperature sensor between the first heat exchange unit and the check valve, so as to calculate a superheat degree of the refrigerant leaving the first heat exchange unit in the first branch, wherein the branch expansion valve is an electronic expansion valve which has a controller, the controller has a built-in preset value of branch superheat degree, and the controller is configured to control an opening degree of the branch expansion valve so that an actual superheat degree of the refrigerant leaving the first heat exchange unit in the first branch path approaches the preset value of the branch superheat degree.

Optionally, according to some embodiments of the heat exchange system, the heat exchange system further includes a second temperature sensor that monitors a compressor outlet temperature, and the controller of the branch expansion valve is further configured to increase the opening degree of the branch expansion valve when a temperature sensed by the second temperature sensor is greater than a predetermined value.

Optionally, according to some embodiments of the heat exchange system, in the first heat exchange unit, the second portion of the refrigerant flows in the same direction as or the opposite direction to the first portion of the refrigerant in the main circuit, and/or, in the second heat exchange unit, the first portion of the refrigerant flows in the same direction as or the opposite direction to the refrigerant flowing from the evaporator to the inlet of the compressor.

In another aspect, a combined heat exchanger is provided, which includes: a first heat exchange unit and a second heat exchange unit; a main flow path, which extends between an inlet of the main flow path and an outlet of the main flow path, and which includes a first portion located in the first heat exchange unit and a second portion located in the second heat exchange unit; a first heat-exchange flow path, which extends between an inlet of the first heat-exchange flow path and an outlet of the first heat-exchange flow path, and which exchanges heat in the first heat exchange unit with the first portion of the main flow path; and a second heat-exchange flow path, which extends between an inlet of the second heat-exchange flow path and an outlet of the second heat-exchange flow path, and which exchanges heat in the second heat exchange unit with the second portion of the main flow path.

Optionally, according to some embodiments of the combined heat exchanger, the combined heat exchanger is a plate heat exchanger.

In further another aspect, a method for optimizing a heat exchange system, particularly a method for optimizing a refrigeration system for an electric transport vehicle, is provided. The heat exchange system includes: an enhanced vapor injection compressor, a condenser, an expansion valve and an evaporator, which are located in a main circuit; wherein the heat exchange system further includes a first branch branched from the main circuit to an vapor injection port of the compressor at a branch point P downstream of the condenser, and a first heat exchange unit and a second heat exchange unit are further provided in the main circuit between the branch point P and the expansion valve; the method includes: dividing a refrigerant leaving the condenser at the branch point P into a first portion passing through the first heat exchange unit and the second heat exchange unit from the main circuit, and a second portion passing through the first branch to the vapor injection port; causing the second portion of the refrigerant to pass through a branch expansion valve and exchange heat in the first heat exchange unit with the first portion of the refrigerant in the main circuit; and causing the first portion of the refrigerant to exchange heat in the second heat exchange unit with the refrigerant flowing from the evaporator to an inlet of the compressor.

Optionally, the branch expansion valve is an electronic expansion valve, and the method includes: controlling an opening degree of the electronic expansion valve based on a preset value of branch superheat degree and an actual superheat degree of the refrigerant leaving the first heat exchange unit in the first branch; and increasing the opening degree of the electronic expansion valve when a compressor outlet temperature is greater than a predetermined value.

BRIEF DESCRIPTION OF THE DRAWINGS

The contents of the present disclosure will become easier to understand with reference to the accompanying drawings. It can be easily understood by those skilled in the art that the drawings are merely used for illustration, and are not intended to limit the scope of protection of the present disclosure. In addition, like parts are denoted by like numerals in the drawings, wherein.

DETAILED DESCRIPTION OF THE EMBODIMENT(S) OF THE INVENTION

Figure 1:
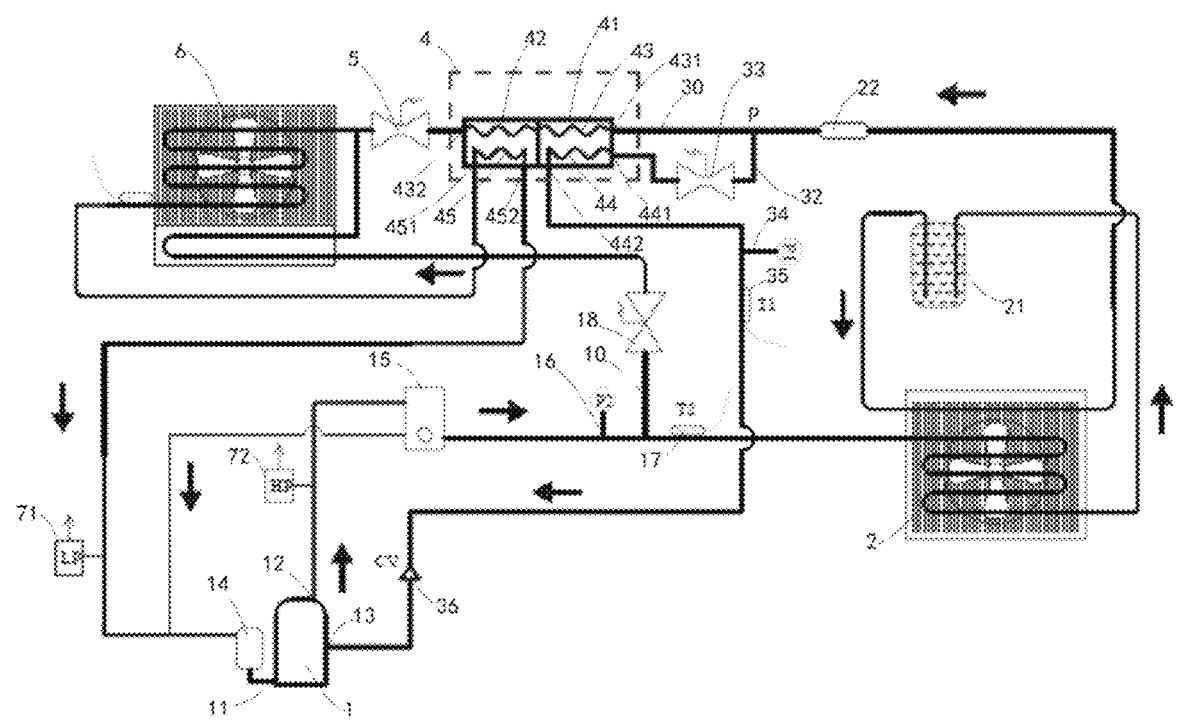
FIG. 1 is a schematic structural view of a heat exchange system according to an embodiment of the present disclosure.

First, referring to FIG. 1, a heat exchange system according to an embodiment of the present disclosure will be described. The system may be used in various working conditions, especially for a refrigeration system for an electric transport vehicle. The electric transport vehicle refers to a vehicle powered by a power battery, which is more sensitive to energy consumption. The heat exchange system includes an enhanced vapor injection compressor 1, a condenser 2, an expansion valve 5 and an evaporator 6, which are located in a main circuit. The enhanced vapor injection compressor 1 includes a compressor inlet 11, a compressor outlet 12 and an vapor injection port 13. As shown in the figure, a high-temperature, high-pressure vapor leaving the compressor outlet 12 of the heat exchange system is separated by an oil separator 15. The oil separated by oil separator 15 returns to the compressor inlet 11 through an oil return pipe and a gas-liquid separator 14 while a refrigerant enters the condenser 2. After leaving the condenser 2, the refrigerant passes through a liquid storage dryer 21, then exchanges heat with a subcooling section of the condenser 2, and passes through a sight glass 22 to reaches a branch point P. At the branch point P downstream of the condenser 2, a first branch 32 is branched from the main circuit to the vapor injection port 13 of the compressor 1, and a first heat exchange unit 41 and a second heat exchange unit 42 are provided in the main circuit between the branch point P and the expansion valve 5. The refrigerant from the condenser 2 is divided at the branch point P into a first portion passing through the first heat exchange unit 41 and the second heat exchange unit 42 from the main circuit 30, and a second portion passing through the first branch 32 to the vapor injection port 33, wherein the second portion of the refrigerant passes through a branch expansion valve 33 and exchanges heat in the first heat exchange unit 41 with the first portion of the refrigerant in the main circuit, and the first portion of the refrigerant exchanges heat in the second heat exchange unit 42 with a refrigerant flowing from the evaporator 6 to the compressor inlet 11. By allowing the refrigerants to exchange heat in the first heat exchange unit 41 and the second heat exchange unit 42 in sequence before entering the expansion valve 5, a supercooling degree of the refrigerant before entering the expansion valve 5 is increased, and efficiency and capacity of the heat exchange system are improved, thereby improving the performance and energy consumption of heat exchange system. In addition, since the temperature at the compressor outlet 12 is related to the superheat degree of the refrigerant entering the compressor through the vapor injection port 13, the superheat degree of the refrigerant entering the vapor injection port 13 of the compressor 1 can be adjusted by controlling an opening degree of the branch expansion valve 33, thereby controlling the compressor outlet temperature. Finally, because the branch expansion valve 33 is used, the first branch can keep its operation, thus avoiding the effect resulted from the space between a check valve and the vapor injection port 13 on the compressor efficiency. In this thermal cycle system, the refrigerant passes through the expansion valve 5 and the evaporator 6 after passing through the first heat exchange unit 41 and the second heat exchange unit 42, and the refrigerant leaving the evaporator 6 passes through the second heat exchange unit 42 and then returns to compressor inlet 11. The heat exchange system may further include a second branch 10 communicating with the compressor outlet 12 and used for defrosting. The second branch 10 includes a hot gas valve 18 which, in a defrosting mode, is opened to allow the high-temperature gas from the compressor outlet 12 to exchange heat with the evaporator 6 for defrosting; the gas is finally passed between the expansion valve 5 and the evaporator 6 in the main circuit. In addition, a low-pressure switch 71 may be provided upstream of the compressor inlet 11, and a high-pressure switch may be provided downstream of the compressor outlet 12.

In some embodiments, the first heat exchange unit 41 and the second heat exchange unit 42 are included in an integrated combined heat exchanger 4, the structures of the first heat exchange unit 41 and the second heat exchange unit 42 may be simplified through such a design, and pipelines and joints connecting the first heat exchange unit 41 and the second heat exchange unit 42 may be omitted. In some embodiments, the combined heat exchanger 4 includes: a main flow path 43, which extends between an inlet 431 of the main flow path and an outlet 432 of the main flow path, and which includes a first portion located in the first heat exchange unit 41 and a second portion located in the second heat exchange unit 42; a first heat-exchange flow path 44, which extends between an inlet 441 of the first heat-exchange flow path and an outlet 442 of the first heat-exchange flow path, and which exchanges heat in the first heat exchange unit 41 with the first portion of the main flow path 43; and a second heat-exchange flow path 45, which extends between an inlet 451 of the second heat-exchange flow path and an outlet 452 of the second heat-exchange flow path, and which exchanges heat in the second heat exchange unit 42 with the second portion of the main flow path 43. In the embodiment shown in the figure, in the first heat exchange unit 41, the two streams of fluid flow in the same direction during heat exchange, that is, the fluid in the first portion of the main flow path 43 and the fluid in the first heat-exchange flow path 44 flow from right to left during heat exchange; and in the second heat exchange unit 42, the two streams of fluid flow in opposite directions during heat exchange, that is, the fluid in the second portion of the main flow path flows from right to left during heat exchange, and the fluid in the second heat-exchange flow path 45 flows from left to right during heat exchange. In some other embodiments, the two streams of fluid in the two heat exchange units may either flow in opposite directions or in the same direction during heat exchange.

In some embodiments, the first branch 32 further includes a check valve 36 disposed between the first heat exchange unit 41 and the vapor injection port 13 of the compressor, and a first pressure sensor 34 and a first temperature sensor 35 between the first heat exchange unit 41 and the check valve 36, so as to calculate a superheat degree of the refrigerant leaving the first heat exchange unit 41 in the first branch. The branch expansion valve 33 is an electronic expansion valve which has a controller, the controller of the branch expansion valve 33 has a built-in preset value of branch superheat degree, such as SH=5 or SH=10 or the like, and the controller is configured to control an opening degree of the branch expansion valve 33 so that an actual superheat degree of the refrigerant leaving the first heat exchange unit 41 in the first branch path approaches the preset value of the branch superheat degree. For example, when the superheat degree of the refrigerant leaving the first heat exchange unit 41 in the first branch 32 calculated based on the first pressure sensor 34 and the first temperature sensor 35 is greater than the preset value, the opening degree of the branch expansion valve 33 is increased; otherwise, the opening degree of the branch expansion valve 33 is decreased. On the other hand, the heat exchange system may further include a second temperature sensor 17 that monitors the temperature of the compressor outlet 12, and a second pressure sensor 16. The controller of the branch expansion valve 33 is further configured to increase the opening degree of the branch expansion valve 33 when the temperature sensed by the second temperature sensor 17 is greater than a predetermined value, thereby controlling the compressor outlet temperature to be lower than the set predetermined value.

Figure 2:
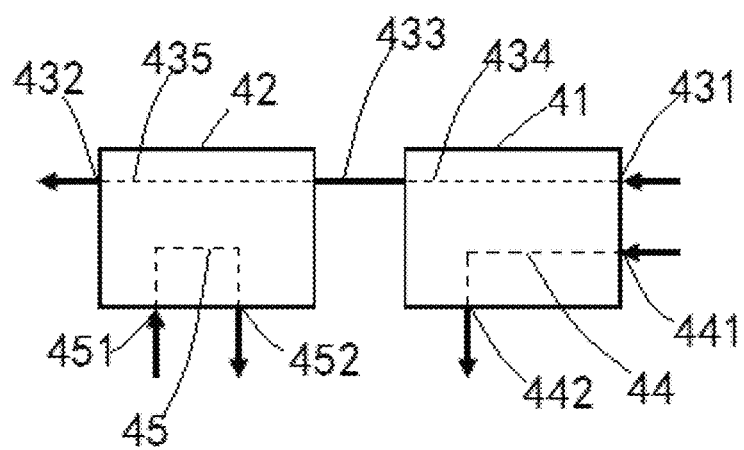
FIG. 2 shows another embodiment of a heat exchanger according to an embodiment of the present disclosure.

Continued reference is made to FIG. 2, which shows another embodiment according to the present disclosure. In this embodiment, the first heat exchange unit 41 and the second heat exchange unit 42 are separate heat exchangers, wherein the main flow path 43 includes a first portion 434 in the first heat exchange unit 41 and a second portion 435 in the second heat exchange unit 42, and the first portion 434 and the second portion 435 are connected by a pipeline 433. In such an embodiment, the first heat exchange unit 41 and the second heat exchange unit 42 are independent from each other and do not interfere with each other, but additional pipelines and joints related to the pipeline 433 are needed.

Figures 3, 4:
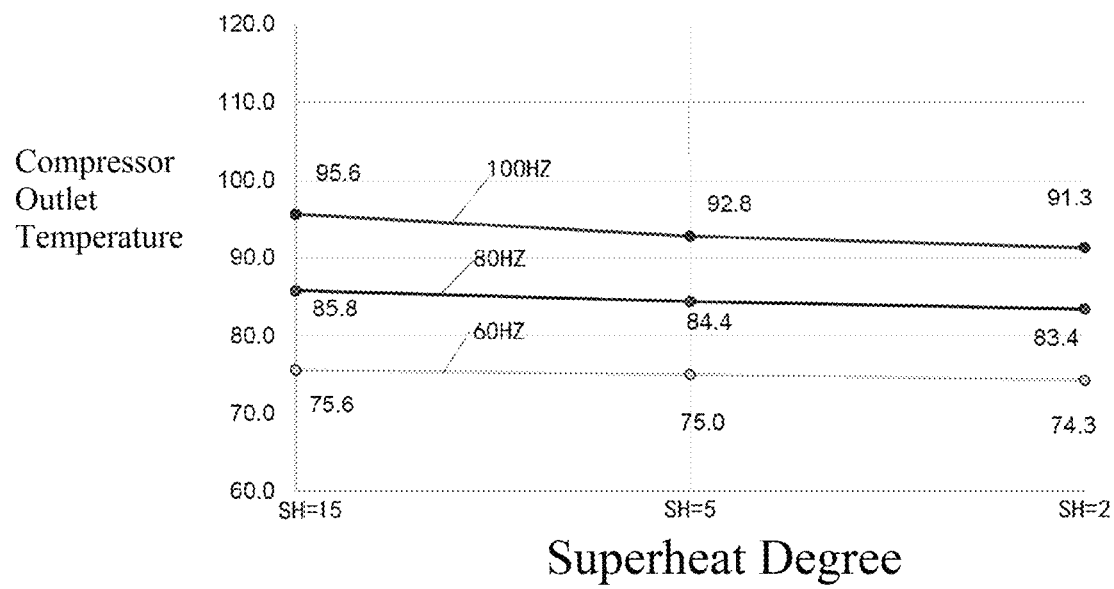
FIG. 3 shows a curve of a superheat degree and a compressor outlet temperature according to an embodiment of the present disclosure.
FIG. 4 shows a comparison of a heat exchange system according to an embodiment of the present disclosure with a conventional system in terms of capacity and efficiency.

Referring to FIG. 3, a relationship between the superheat degree of the refrigerant in the first branch and the compressor outlet temperature according to the embodiment of the present disclosure is shown. It can be seen that whatever frequency the compressor is operating at, as long as the superheat degree of the refrigerant leaving the first heat exchange unit in the first branch is reduced, the compressor outlet temperature can be reduced. Therefore, the compressor outlet temperature can be kept below a predetermined value by adjusting the opening degree of the branch expansion valve.

Continued reference is made to FIG. 4, which shows a comparison of the heat exchange system according to the embodiment of the present disclosure with two types of heat exchange systems. In the system 1, a portion of the refrigerant from the condenser passes through an injection valve and a one-way valve to the vapor injection port of the enhanced vapor injection compressor, and the other portion of the refrigerant, before entering the evaporator, exchanges heat with the refrigerant directed to the inlet of the compressor from the evaporator. In the system 2, a portion of the refrigerant from the condenser passes the expansion valve, then exchanges heat with the refrigerant directed to the evaporator, and then passes through the one-way valve to the vapor injection port of the enhanced vapor injection compressor. It can be seen that the heat exchange system according to the present disclosure has a stronger capacity and higher efficiency than the system 1 and the system 2, and is particularly suitable for an electric transport vehicle that is sensitive to energy consumption.

In another aspect, a method for optimizing a heat exchange system, particularly a method for optimizing a refrigeration system for an electric transport vehicle, is provided. The heat exchange system includes: an enhanced vapor injection compressor 1, a condenser 2, an expansion valve 5 and an evaporator 6, which are located in a main circuit; wherein the heat exchange system further includes a first branch 32 branched from the main circuit to an vapor injection port of the compressor at a branch point P downstream of the condenser, and a first heat exchange unit 41 and a second heat exchange unit 42 are further provided in the main circuit between the branch point P and the expansion valve 5; the method includes: dividing a refrigerant leaving the condenser at the branch point P into a first portion passing through the first heat exchange unit and the second heat exchange unit from the main circuit, and a second portion passing through the first branch to the vapor injection port; causing the second portion of the refrigerant to pass through a branch expansion valve and exchange heat in the first heat exchange unit with the first portion of the refrigerant in the main circuit; and causing the first portion of the refrigerant to exchange heat in the second heat exchange unit with the refrigerant flowing from the evaporator to an inlet of the compressor. In some embodiments, the branch expansion valve is an electronic expansion valve, and the method includes: controlling an opening degree of the electronic expansion valve based on a preset value of branch superheat degree and an actual superheat degree; and increasing the opening degree of the electronic expansion valve when a compressor outlet temperature is greater than a predetermined value.

Various specific embodiments of the present disclosure have been described above. It should be understood that the scope of the present disclosure is not limited to the illustrated embodiments and is defined by the claims. Modifications or variations that do not depart from the concept of the present disclosure should also be included within the scope of the present disclosure.

What is claimed is:

1. A method for optimizing a refrigeration system for an electric transport vehicle, the heat exchange system comprising: an enhanced vapor injection compressor, a condenser, an expansion valve and an evaporator, which are located in a main circuit; wherein the heat exchange system further comprises a first branch branched from the main circuit to an vapor injection port of the compressor at a branch point P downstream of the condenser, and a first heat exchange unit and a second heat exchange unit are further provided in the main circuit between the branch point P and the expansion valve;

the method comprising:

dividing a refrigerant leaving the condenser at the branch point P into a first portion passing through the first heat exchange unit and the second heat exchange unit from the main circuit, and a second portion passing through the first branch to the vapor injection port;

causing the second portion of the refrigerant to pass through a branch expansion valve and exchange heat in the first heat exchange unit with the first portion of the refrigerant in the main circuit; and causing the first portion of the refrigerant to exchange heat in the second heat exchange unit with the refrigerant flowing from the evaporator to an inlet of the compressor;

wherein the first heat exchange unit and the second heat exchange unit are included in an integrated, combined heat exchanger, the combined heat exchanger is a plate heat exchanger;

wherein the combined heat exchanger comprises:

a main flow path, which extends between an inlet of the main flow path and an outlet of the main flow path, and which comprises a first portion located in the first heat exchange unit and a second portion located in the second heat exchange unit;

a first heat-exchange flow path, which extends between an inlet of the first heat-exchange flow path and an outlet of the first heat-exchange flow path, and which exchanges heat in the first heat exchange unit with the first portion of the main flow path; and a second heat-exchange flow path, which extends between an inlet of the second heat-exchange flow path and an outlet of the second heat-exchange flow path, and which exchanges heat in the second heat exchange unit with the second portion of the main flow path;

wherein the refrigerants exchange heat in the first heat exchange unit and the second heat exchange unit in sequence.

2. The method according to claim 1, wherein the branch expansion valve is an electronic expansion valve, and the method comprises: controlling an opening degree of the electronic expansion valve based on a preset value of branch superheat degree and an actual superheat degree of the refrigerant leaving the first heat exchange unit in the first branch; and increasing the opening degree of the electronic expansion valve when a compressor outlet temperature is greater than a predetermined value.

* * * * *